May 25, 1965 R. H. HIGGINS 3,185,307

TAPE STORAGE RACK

Filed Dec. 10, 1962 2 Sheets-Sheet 1

INVENTOR.
ROBERT H. HIGGINS

BY Price & Heneveld

ATTORNEYS

May 25, 1965 R. H. HIGGINS 3,185,307

TAPE STORAGE RACK

Filed Dec. 10, 1962 2 Sheets-Sheet 2

INVENTOR.
ROBERT H. HIGGINS

BY Price & Heneveld

ATTORNEYS

United States Patent Office 3,185,307

Patented May 25, 1965

3,185,307

TAPE STORAGE RACK

Robert H. Higgins, Grand Rapids, Mich., assignor to Steelcase, Inc., Grand Rapids, Mich., a corporation of Michigan Filed Dec. 10, 1962, Ser. No. 243,522

5 Claims. (Cl. 211—40)

This invention concerns adjustable storage racks, and more particularly a storage rack with adjustable dividers for holding articles such as tape reels of varying widths.

With the increasing use of data processing machines using data recorded on tape of one form or another, there has been an increasing demand for storage facilities for tape reels. In order to reduce the number of different items which have to be carried in stock to satisfy customer requirements, manufacturers of tape storage racks have found it desirable to build the racks in such a manner that they can easily be modified by the customer to hold reels of various sizes, whether uniform or intermixed.

The present invenion provides a very simple, effective, and inexpensive way of making a tape storage cabinet thus adjustable without sacrificing stability or aesthetic value.

It is therefore the object of the invention to provide a tape reel storage rack which is readily adjustable to receive reels of varying widths either uniformly of intermixed.

It is a further object of the invention to provide a device of the type described in which the tape reels are held and separated by dividers which can be readily and easily moved into a large number of discrete spacings as dictated by the width of the reels to be stored.

It is a further object of the invention to provide easy adjustment of dividers in a storage rack by providing a corrugated strip cooperating with a pair of parallel flanges to receive and hold therebetween fingers formed on the dividers for this purpose.

It is still another object of the invention to provide means by which a plurality of storage racks of the type described can easily and quickly be connected together to form a single multiple capacity unit.

These and other objects of the invention will become apparent from the following specification taken in connection with the accompanying drawings in which.

Basically, the invention achieves the adjustability of the dividers by constructing the divider holders from a pair of parallel flanges that hold a corrugated member between them. Divider-receiving openings are formed alternately between the corrugated member and one of the flanges, and between the corrugated member and the other flange. The corrugated member can be made strong enough yet resilient enough to tightly embrace dividers inserted into these openings and hold them tightly against any movement other than vertical. The flexibility of the arrangement can be further enhanced by holding the corrugated member fixedly only at its ends, and permitting it a degree of longitudinal movement between its extremities, in accordance with a preferred embodiment of the invention.

In accordance with another aspect of the invention, several of the cabinet units of this invention can be connected together rapidly and securely by a sliding locking member which in one position passes through apertures formed in flanges of the cabinets, and can then be slid into a second position in which it clamps the flanges together adjacent the apertures.

Figure 1:
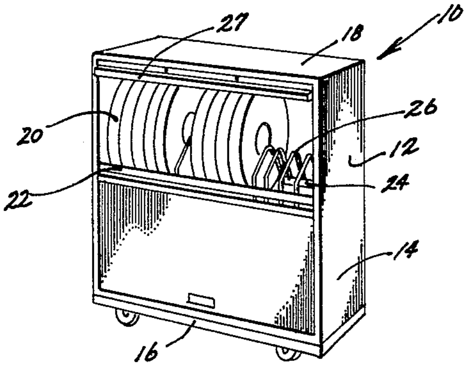
FIG. 1 is a perspective view showing the device of the invention in use.

Referring to the drawings, FIG. 1 shows a typical tape storage cabinet assembly 10 according to this invention. The cabinet assembly 10 is composed of a pair of cabinets or cabinet units 12 and 14, a base 16, and a top 18. Tape reels 20 are supported on the divider holders 22, 24 and are held in upright and spaced relationship by the adjustable dividers 26. Doors such as 27 may be provided to close the cabinet units 12, 14 when desired.

Figure 2:
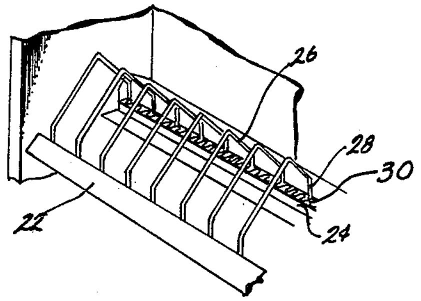
FIG. 2 is an enlarged perspective view showing a portion of the dividers and their holders.

FIG. 2 shows the divider holders 22, 24 and the dividers 26 in greater detail. It will be noted that the dividers 26 are generally U-shaped and have protruding fingers or legs such as 28 whose extremities are received in openings 30 of the divider holder 24.

Figure 3:
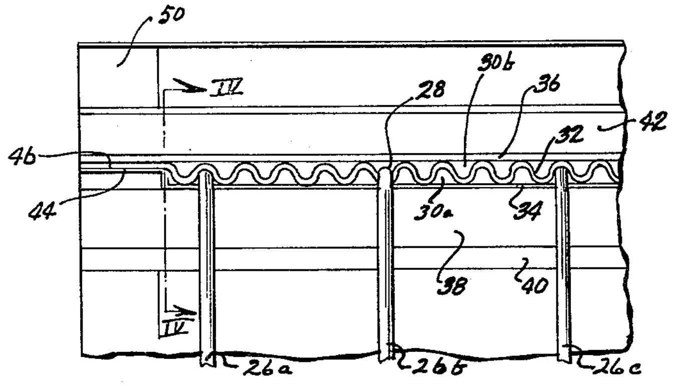
FIG. 3 is a fragmentary plan view illustrating in detail the construction of one of the divider holders.
Figure 4:
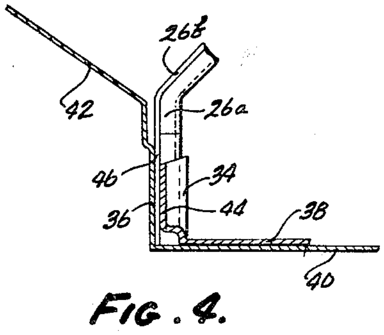
FIG. 4 is a vertical section along line IV—IV of FIG. 3.

The nature of these openings 30 are shown in greater detail in FIG. 3. In that figure and FIG. 4, it will be seen that the openings 30 are formed between the corrugations of a corrugated member 32 which is held in a vertical attitude between an inner flange 34 and an outer flange 36. As is more clearly shown in FIG. 4, the inner flange 34 is formed by the upright portion of an L-shaped member 38. The horizontal leg of the L-shaped member 38 is superimposed upon and attached to the horizontal portion of a second L-shaped member 40. The vertical portion 36 of the second L-shaped member 40 has formed thereon an extension 42 which extends upwardly and outwardly from the top of the flange 36 and serves as a backstop for the tape reels 20.

In a preferred embodiment of the invention, the end portion 44 of the flange 34 is outwardly offset from the remainder of the flange 34. A flat end portion 46 of the corrugated member 32 is held between this offset portion 44 and the end portions of the outer flange 36, to which the end portions 44 and 46 are secured by any convenient means such as welding. The dividers 26 have the end extremities of their legs 28 inserted into the openings 30, and it will be observed that they may be inserted either into one of the openings 30*a* formed between the corrugated member 32 and the inner flange 34, or into one of the openings 30*b* formed between the corrugated member 32 and the outer flange 36, even though the latter position is somewhat further from divider holder 22, near the front of the cabinet, than is the former position. This is so because the shape of the dividers 26 readily permits their legs to be flexed, either together or apart, thus allowing them to be elastically deformed or biased into a spacing different than their natural unflexed spacing. As a matter of example, the dividers 26*a* and 26*c* are shown inserted in openings 30*a* in FIG. 3, whereas the divider 26*b* is shown inserted in one of the openings 30*b*.

Figure 5:
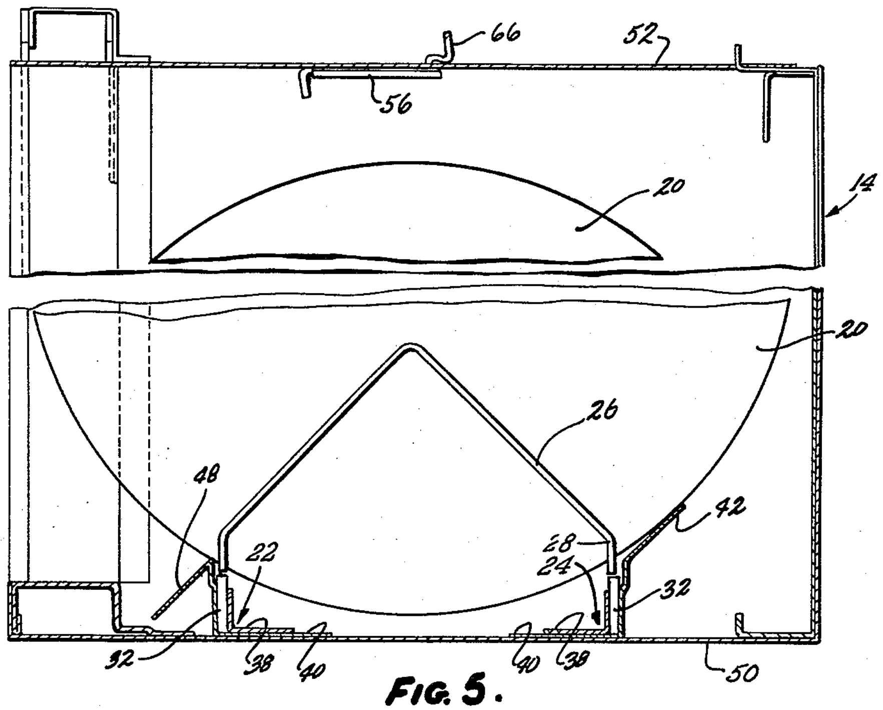
FIG. 5 is a vertical section of one of the cabinet units shown in FIG. 1.

Referring now to FIG. 5, it will be seen that whereas the rear divider holder 24 has an extension 42 directed upwardly and outwardly, the front divider holder 22 has a similar extension 48 which is, however, directed downwardly and outwardly. The extension 48 serves as a deflector to guide the tape reels 20 over the divider holder 22 when the tape reel 20 is placed in the cabinet.

The divider holders 22 and 24 are rigid units which, in a preferred embodiment, are affixed to the cabinet 12 or 14 only at their end portions, where they may be welded to flanges 50 of the cabinet structure which form a suitable supporting surface of generally horizontal disposition. This rigidity obviates the necessity of providing a bottom for the cabinets 12, 14.

Figure 7:
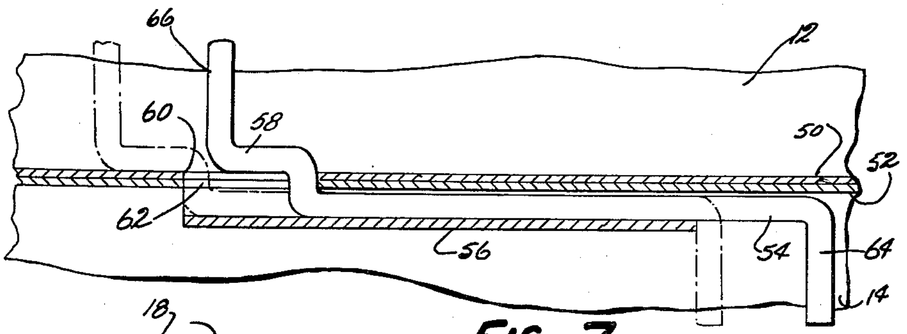
FIG. 7 is a detail elevation of the locking mechanism by which the cabinet units are held together.
Figure 6:
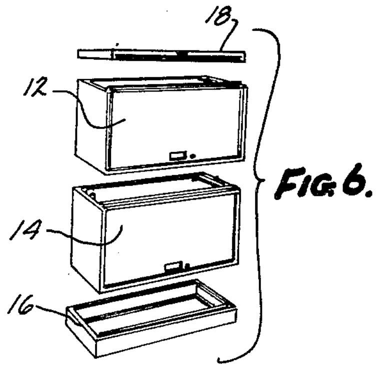
FIG. 6 is an exploded view showing the manner in which the various cabinet units fit together.

FIGS. 6 and 7 illustrate the manner in which the cabinets 12, 14 can be assembled to form a single rigid unit. Referring particularly to FIG. 7, it will be seen that cabinet 14, for example, is provided with a top flange 52 upon which the flange 50 of cabinet 12 comes to rest when the two units are assembled together. The flange 52 carries a locking member 54 slidable in a housing 56 and having a clamping tongue 58 which protrudes through apertures 60, 62 formed in the flanges 50, 52, respectively. The cabinet units 12, 14 are assembled together by superposing them upon one another with the locking members 54 in the full line position of FIG. 7. The locking member 54 is then slid to the left in FIG. 7 until it assumes the position shown in dotted lines in that figure. It will be readily seen that in that position, the locking member 54 clamps the flanges 50, 52 between the clamping tongue 58 and its main body held by the housing 56 so that the cabinet units 12, 14 cannot be pulled apart. The locking member 54 is provided with vertically extending portions 64, 66 at both of its ends so that it can be maneuvered from either the unit 12 or the unit 14.

It will be seen that the present invention provides a simple and effective adjustable storage rack for tape reels of varying sizes, whether consistent or intermixed. Obviously, the teachings of this invention can be carried out in many different ways, of which the embodiment shown is merely illustrative. Consequently, the invention is not to be deemed limited by the embodiment shown, but only by the scope of the following claims.

I claim:

1. In a storage rack, the improvement comprising: a horizontal supporting surface; a pair of spaced generally parallel divider holders on said surface, each of said divider holders including a pair of horizontally elongated L-shaped elements each having a horizontal portion extending in the same direction and lying one on the other and affixed to said surface, each having a vertical portion parallel to but spaced from the vertical portion of the other element of the holder, a vertically disposed corrugated member held between said vertical portions; said vertical portions and said corrugated member each having longitudinal end portions bonded together, said corrugated member intermediate its ends being free to move between said vertical portions; and a plurality of dividers each having a pair of generally parallel fingers spaced apart by substantially the distance between said holders, and said fingers being inserted between said corrugated member and one of said flanges and firmly held thereby.

2. The device of claim 1 in which each said end portion of said corrugated members is flat.

3. The device of claim 1, in which said vertical portion of the outer element of one of said holders is provided with an extension, said extension being directed diagonally upwardly outwardly.

4. The device of claim 1, in which said vertical portion of the outer element of each of said holders is provided with an extension, one of said extensions being directed diagonally upwardly outwardly, and the other being directed diagonally downwardly outwardly.

5. In a storage rack, the improvement comprising: a horizontal supporting surface; a pair of spaced generally parallel divider holders on said surface, each of said divider holders including a pair of horizontally elongated elements each having a horizontal portion affixed to said surface and a vertical portion parallel to but spaced from the vertical portion of the other element of the holder, and a vertically disposed corrugated member held between said vertical portions; said vertical portions and said corrugated member each having longitudinal end portions bonded together, said corrugated member intermediate its ends being free to move between said vertical portions; each said end portion of said corrugated members being flat.

References Cited by the Examiner

UNITED STATES PATENTS

| | | | |
|---|---|---|---|
| 428,555 | 5/90 | Dom | 211—40 |
| 832,954 | 10/06 | Buehler | 312—10 |
| 1,178,611 | 4/16 | Weiss | 312—107 |
| 1,237,010 | 8/17 | Adams | 211—40 |
| 1,253,546 | 1/18 | Vanderveld | 312—107 |
| 1,376,703 | 5/21 | Kimmel | 312—10 |
| 2,238,451 | 4/41 | Roth | 211—40 |
| 2,346,706 | 4/44 | Sabin | 211—40 |
| 2,557,630 | 6/51 | Brown | 312—107 |
| 2,702,127 | 2/55 | Pastorius | 211—41 |
| 2,797,975 | 7/57 | MacAleese | 312—140.3 |
| 2,899,076 | 8/59 | Gullixson | 211—40 |
| 2,917,179 | 12/59 | Casey | 211—40 |
| 3,107,131 | 10/63 | Lightburn | 312—107 |

FOREIGN PATENTS

| | | |
|---|---|---|
| 441,801 | 1936 | Great Britain. |
| 574,026 | 1958 | Italy. |

FRANK L. ABBOTT, *Primary Examiner.*